United States Patent [19]

Okamura et al.

[11] Patent Number: 5,498,951
[45] Date of Patent: Mar. 12, 1996

[54] METHOD AND APPARATUS FOR CHARGING ELECTRIC DOUBLE LAYER CAPACITOR

[75] Inventors: Michio Okamura; Takeshi Morimoto; Kazuya Hiratsuka, all of Kanagawa, Japan

[73] Assignee: JEOL Ltd., Tokyo, Japan

[21] Appl. No.: 269,010

[22] Filed: Jun. 30, 1994

[30] Foreign Application Priority Data

| Jun. 30, 1993 | [JP] | Japan | 5-187539 |
| Jun. 30, 1993 | [JP] | Japan | 5-187542 |
| Aug. 18, 1993 | [JP] | Japan | 5-225206 |

[51] Int. Cl.$^6$ ............... H02N 1/00; H02J 7/00
[52] U.S. Cl. ........................ 322/2 R; 320/1
[58] Field of Search .................. 320/1; 322/2 A, 322/2 R

[56] References Cited

U.S. PATENT DOCUMENTS

| 3,526,821 | 9/1970 | Thomas | 320/1 |
| 3,911,348 | 10/1975 | Takemura et al. | 320/1 |
| 4,709,200 | 11/1987 | Ochiai | 320/1 |
| 4,963,811 | 10/1990 | Weber | 320/1 |

FOREIGN PATENT DOCUMENTS

| 9030345 | 3/1990 | European Pat. Off. |
| 0564149 | 3/1993 | Japan | H02J 15/00 |

Primary Examiner—Thomas M. Dougherty
Assistant Examiner—Nicholas Ponomarenko
Attorney, Agent, or Firm—Webb Ziesenheim Bruening Logsdon Orkin & Hanson

[57] ABSTRACT

Method and apparatus for quickly and efficiently charging an electric double layer capacitor. The capacitor is charged by a constant-current power supply which is preferably a current controlled output type switching power supply. To cause the voltage across the terminals of the capacitor to reach its working voltage in a short time, the capacitor is overcharged for a short time. Where the capacitor is charged with a solar battery, a constant-current output type switching regulator is interposed between the solar battery and the capacitor.

11 Claims, 5 Drawing Sheets

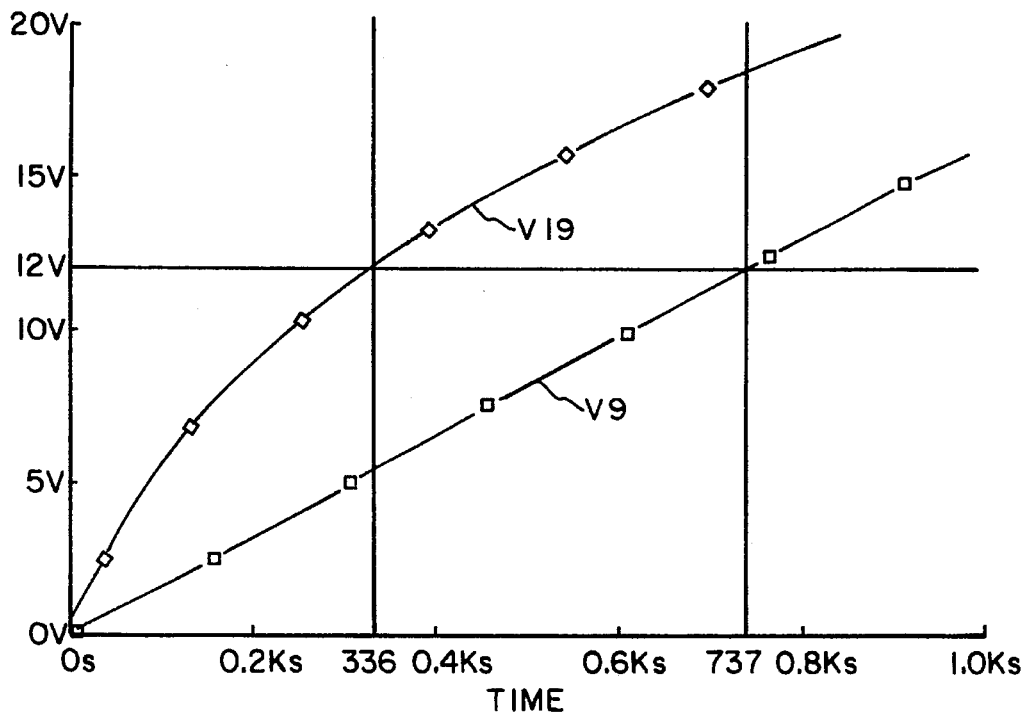
FIG. 16
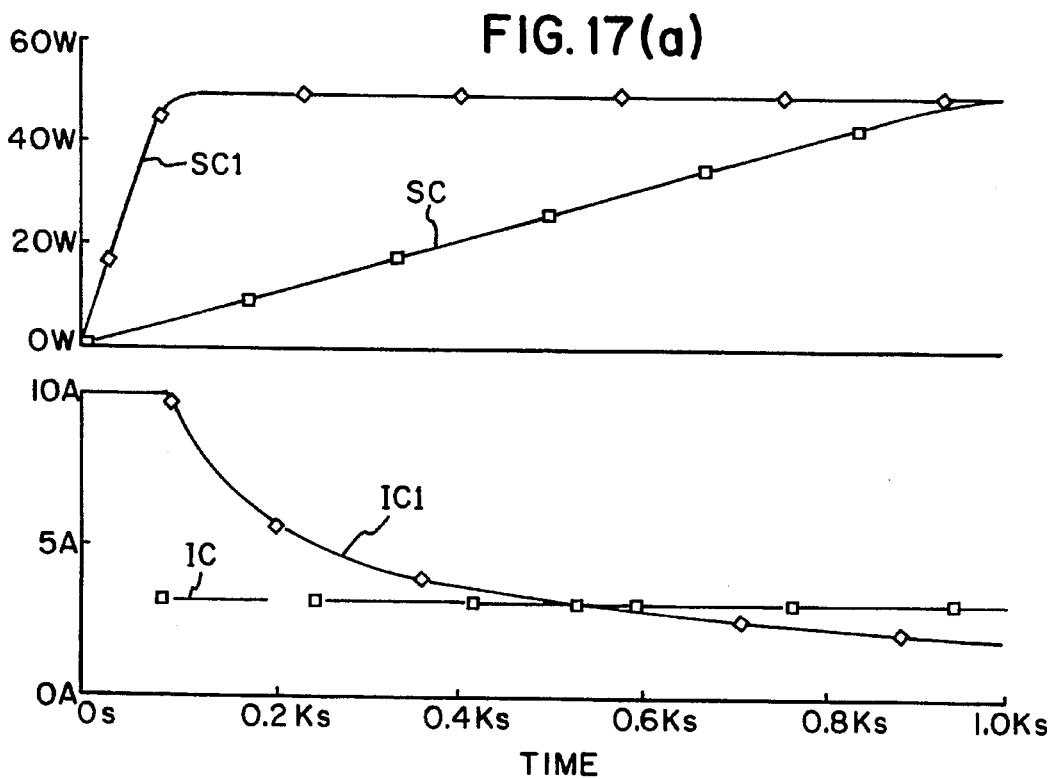
FIG. 17(a)
FIG. 17(b)

METHOD AND APPARATUS FOR CHARGING ELECTRIC DOUBLE LAYER CAPACITOR

FIELD OF THE INVENTION

The present invention relates to a method and apparatus for charging an electric double layer capacitor and, more particularly, to a method and apparatus adapted for use with an electric double layer capacitor which is used in electric power applications, for example, the capacitor may be employed as a power source for driving an electric vehicle.

BACKGROUND OF THE INVENTION

Electric vehicles need large electric power storage devices. The large electric power storage devices, which are presently being developed, are mainly secondary batteries (also known as storage batteries). These secondary batteries have the great disadvantage of having a short cycle life. In particular, it is generally said that the nominal life of ordinary secondary batteries expires after about 300 to 500 discharges are completed, although the number of the discharges differ, depending of the kind, the rated values, and the depth of discharge. With respect to individual secondary batteries, lead-acid batteries are most often used. The life of lead-acid batteries shortens drastically when the depth of discharge exceeds 60–70%. If nickel-cadmium batteries are recharged before completion of discharge, a significant loss of storage capacity takes place.

An electric double layer capacitor uses activated carbon as its electrode material. Activated carbon is electrochemically inactive and has a large specific surface. The activated carbon is combined with an electrolyte to form a large electric double layer capacitance. The electric double layer capacitor has attracted attention as a power source for an electric vehicle (electric vehicles are an alternative to vehicles with internal combustion engines because electric vehicles produce no harmful exhaust gas). Electric double layer capacitors can be charged in shorter times and have longer cycle lives than secondary batteries. A cycle life of more than 10,000 recharges has been estimated from the experiment carried out by the inventors.

A secondary battery has the advantage that its working voltage does not drop greatly even after the battery has been discharged. Even if the voltage drops, only a slight voltage drop is observed under unloaded condition. For example, in the case of a lead-acid battery, the terminal voltage in a fully charged state is 2.2 volts. This voltage drops only to about 1.8 volts except during charging and in an immediately subsequent transient state. This means the battery is a constant-voltage device which can be charged with little loss by the use of a voltage regulated source. Methods and apparatus for charging secondary batteries are known.

However, techniques for efficiently charging an electric double layer capacitor of large capacitance in a short time have not been yet established. One conceivable method of charging an electric double layer capacitor is to use a voltage regulated source in the same way as in the above-described case of secondary batteries. This is discussed further below.

Energy Ec stored in a capacitor having terminals across which a voltage V is developed is given by $Ec= CV^2/2$, where C is the capacitance of the capacitor. The voltage V across the terminals drops as the capacitor is discharged. Conversely, if the capacitor is charged under a fully discharged state, the voltage across the terminals gradually rises from zero. That is, the capacitor is not a constant-voltage device.

If the capacitor, which is not a constant-voltage device, is charged with a voltage regulated source producing an output voltage V, for example, then the output voltage V is principally applied to a resistive component existing in the charging circuit when a charging operation is started, i.e., when the voltage across the terminals is null. The electric power is wastefully consumed by this resistive component. As the charging progresses and the voltage across the terminals increases, the electric power consumed by the resistive component (other than the capacitor) decreases and becomes zero when the voltage across the terminals reaches V.

The total energy Ep supplied from the power supply until the charging operation is completed is equal to the product of the integrated current flowing to the capacitor, or the total charge, and the voltage V. That is, $Ep=QV= CV^2$.

The charging efficiency, which is defined as the ratio of the energy Ec to the energy Ep, is calculated at 50%. Fifty percent of electric power which is not stored in the capacitor is consumed by the resistive component existing in the charging circuit as described above.

This means that if the capacitor is charged from a voltage regulated source, the maximum charging efficiency attainable is only 50%. As an example, as shown in FIG. 1, if a dry battery voltage source VS is connected in parallel with an electric double layer capacitor CB having an internal resistance RB and is electrically charged, then only half of the energy released from the dry battery voltage source VS can be stored in the capacitor.

It is an object of the present invention to provide a method and apparatus for charging an electric double layer capacitor efficiently and quickly.

It is another object of the invention to provide a method for charging an electric double layer capacitor up to its rated level in a short time.

It is a further object of the invention to provide a method for charging an electric double layer capacitor efficiently and quickly if the capacitor is charged from a solar battery.

SUMMARY OF THE INVENTION

The above objects are achieved by charging an electric double layer capacitor from a current regulated power supply.

In one embodiment of the invention, an electric double layer capacitor is charged up to a given working voltage by the use of a current regulated power supply and the capacitor is overcharged up to a preset voltage exceeding the working voltage for a given (predetermined) time.

In another embodiment of the invention, an electric double layer capacitor is charged from a solar battery composed of an array of solar cells and a constant-current output type switching regulator is connected between the solar battery and the electric double layer capacitor.

BRIEF DESCRIPTION OF THE DRAWINGS

Further features and other objects and advantages will be understood from the following detailed description made with reference to the drawings.

FIG. 16 is a graph showing the behavior in which the voltage developed across the terminals of the capacitor of the circuit shown in FIG. 15 varies with time;

FIG. 17(a) is a graph showing the behavior in which a charging electric power supplied to an electric double layer capacitor varies with time;

FIG. 17(b) is a graph showing the behavior in which a charging electric current supplied to an electric double layer capacitor varies with time.

DETAILED DESCRIPTION OF THE INVENTION

Figure 1:
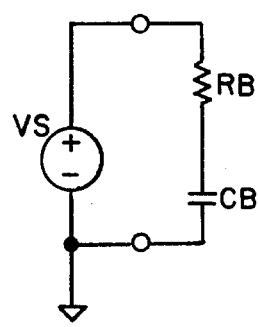
FIG. 1 is a circuit diagram showing a dry battery (voltage source) connected in series with an electric double layer capacitor to charge it which is not according to this invention.
Figure 2:
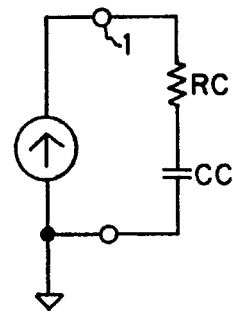
FIG. 2 is a diagram of a circuit according to this invention wherein the electric double layer capacitor is charged by a current regulated power supply.

FIG. 2 is a circuit diagram of one embodiment of the present invention. In FIG. 2, an electric double layer capacitor CC having an internal resistance RC is connected with a charging DC current source power supply IS via a terminal 1. A DC current source power supply supplies a regulated or controlled constant current to load in spite of load variations with time. The value of the current can be optionally set. The charging DC power supply IS is a current regulated power supply which consists of a current output type switching regulator.

Figure 3:
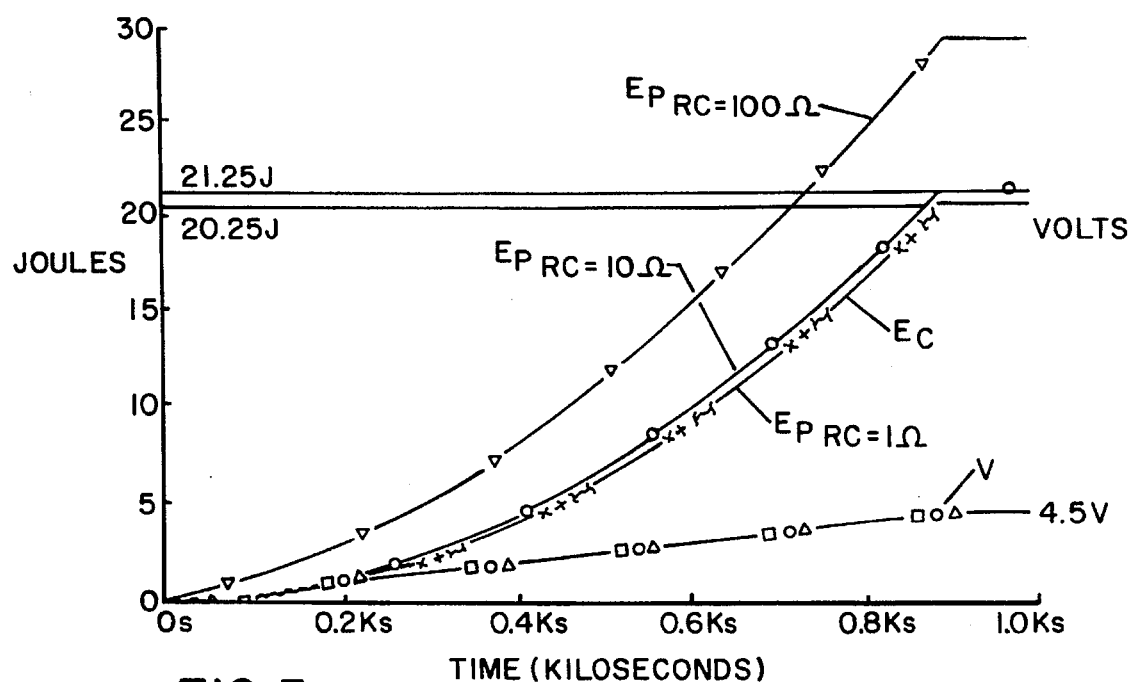
FIG. 3 is a graph showing the behavior in which the energy Ep supplied from a charging power supply, the energy Ec stored in the electric double layer capacitor CC shown in FIG. 2, and the voltage Vc developed across the terminals of the capacitor vary with time when the capacitor CC is charged by the circuit shown in FIG. 2 from the fully discharged state according to this invention.

FIG. 3 is a graph showing the behavior in which the energy Ep of the electric power supplied from the charging power supply, the energy Ec stored in the capacitor CC, and the voltage Vc across the terminals of the capacitor are shown to vary with time when the capacitor CC is charged from a fully discharged state by the circuit shown in FIG. 2. The capacitor CC has a capacitance of 2 F (farads) and a rated voltage of 4.5 volts. The internal resistance RC of the capacitor CC was set to three values, i.e., 1 Ω, 10 Ω, and 100 Ω. In these three cases, the capacitor was charged for 900 seconds with a constant current of 10 milliamps. The results were analyzed by an analog circuit simulator program entitled SPICE (Simulation Program with Integrated Circuit Emphasis).

Referring again to FIG. 3, the energy Ep of the supplied electric energy draws different curves $Ep_{RC=1\Omega}$, $Ep_{RC=10\Omega}$, and $Ep_{RC=100\Omega}$, depending on different values of the internal resistance of the capacitor. The energy Ec of the stored electric power draws a curve close to the curve $Ep_{RC=1\Omega}$, irrespective of the internal resistance. On the other hand, the voltage Vc across the terminals rises along the same straight line, irrespective of the internal resistance, and reaches the rated voltage of 4.5 volts in 900 seconds. Therefore, it can be seen that the time taken to fully charge the capacitor is constant, irrespective of the internal resistance.

Where the internal resistance is 10 Ω, the energy Ep of the electric power supplied from the charging power supply IS for 900 seconds is 21.250 joules. The energy Ec stored in the capacitor at this time is 20.25 joules. The charging efficiency (Ec/Ep) is calculated at about 95%. Similarly, the charging efficiencies in the cases of the internal resistance values of 1 Ω and 100 Ω are calculated at approximately 99% and 69%, respectively.

Figure 4:
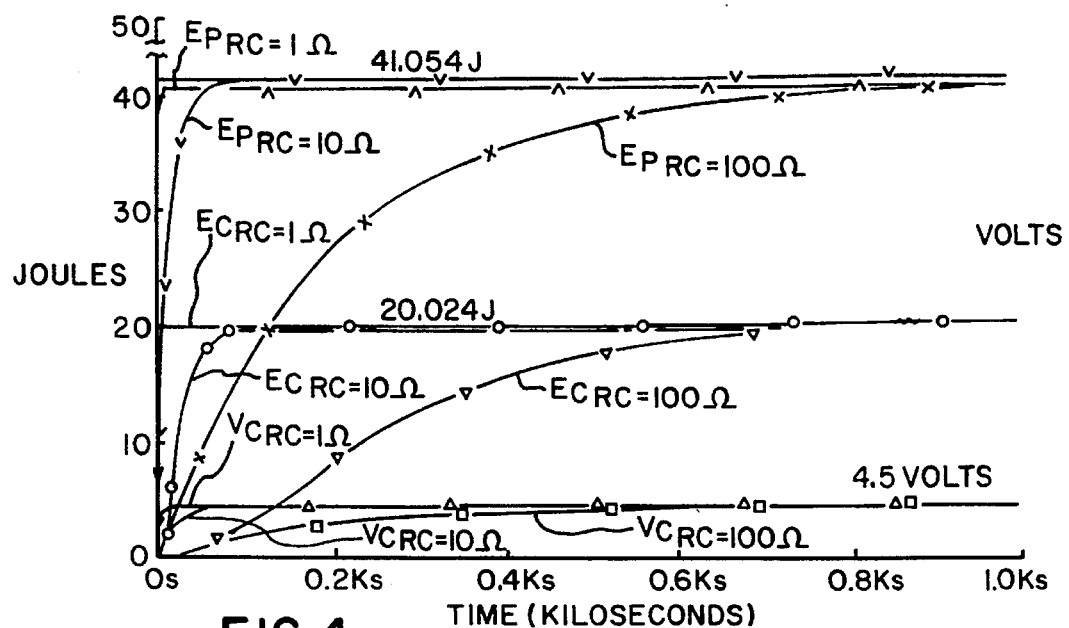
FIG. 4 is a graph showing the behavior in which Ep, Ec and Vc vary with time when the electric double layer capacitor is charged with a voltage regulated power supply which is not according to this invention.

FIG. 4 shows the results of a simulation performed for a case in which the same electric double layer capacitor is charged with a voltage regulated power supply producing an output voltage of 4.5 volts. In FIG. 4, the energy Ec of the electric power stored in the capacitor draws different curves $Ec_{RC=1\Omega}$, $Ec_{RC=10\Omega}$, and $Ec_{RC=100\Omega}$, depending on different values of the internal resistance. Also, the voltage Vc developed across the terminals of the capacitor draws different curves $Vc_{RC=1\Omega}$, $Vc_{RC=10\Omega}$, and $Vc_{RC=100\Omega}$, depending on different values of the internal resistance. These demonstrate that the time required to fully charge the capacitor is increased as the internal resistance increases.

Where the internal resistance is 10 Ω, since Ep= 41,054 joules and Ec=20.024 joules, the charging efficiency Ec/Ep is 48.8%. If the internal resistance is varied, the charging efficiency is substantially maintained at approximately 50%.

It can be seen from comparison of FIGS. 3 and 4 that in the present invention where the electric double layer capacitor is charged by the current regulated power supply, the capacitor is efficiently charged; only the resistor inserted in the charging circuit causes a small ohmic loss. On the other hand, where the capacitor is charged with the voltage regulated power supply, only about half of the electric power supplied from the power supply can be stored in the capacitor, irrespective of the resistance value of the inserted resistor. The above-mentioned efficiency achieved by the present invention is quite advantageous in that the wasted electric power energy can be reduced where a required large amount of electric power should be stored in an electric vehicle equipped with electric double layer capacitors.

Preferably, the electric double layer capacitor is charged by a current regulated power supply which results in only a small amount of loss. An appropriate example of this current regulated power supply is a current regulated power supply whose operation depends on switching action.

Figure 5:
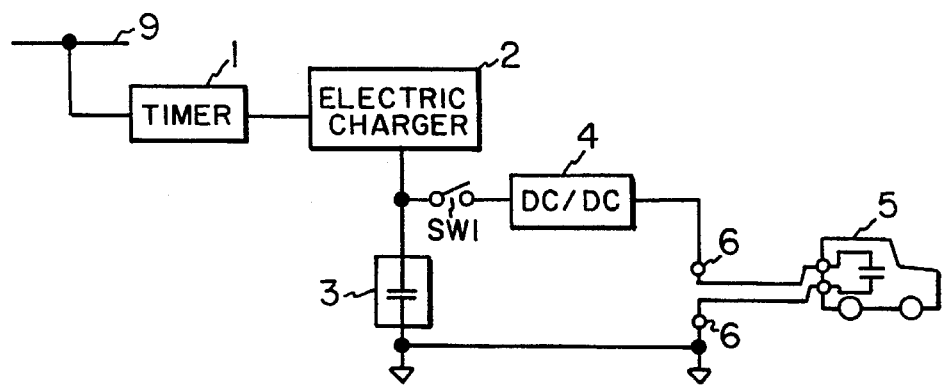
FIG. 5 is a schematic circuit diagram illustrating an arrangement for charging a double layer capacitor in an automobile from a power supply that accumulates energy for quick charging of the double layer capacitor.

Since a large amount of electric energy is stored in an electric double layer capacitor, a large charging electric power is needed if the charging time is short. If the charging current is obtained from a power line, then a capability to deliver temporary high power is needed during charging. FIG. 5 shows another embodiment of the invention designed to provide temporary high power. In this embodiment, the current source is equipped with an electric power storage device. Electric power drawn from the power line is very slowly stored in the storage device. When the need arises, the stored electric power is released to charge an electric double layer capacitor. In this structure, even if the capacity of the AC power line is small, the electric double layer capacitor can be charged in an acceptable length of time.

The charging apparatus shown in FIG. 5 is equipped with a timer 1 which limits reception of electric power from a power line 9 to within the night electric power service hours, for example. When this timer 1 is in operation, night electric power is stored in an electric power storage device 3 via an electric charger 2.

Although a secondary battery such as a lead-acid battery may be used as the electric power storage device 3, an electric double layer capacitor can also be used. In order to store this energy, it is desired to use electric double layer capacitors which have a large electrostatic capacitance, a comparatively larger internal resistance, and characteristics suited for an energy storage.

Where such electric double layer capacitors are used, the charger 2 is preferably a current regulated power supply according to the invention. The charger 2 has a detector means for detecting the voltage across the terminals of each electric double layer capacitor and a circuit for stopping the charging in response to the output from the detector means when the capacitor has been charged up to its rated level. In this way, when the capacitor has been charged to the rated level, the charging can be stopped. This charger 2 causes the electric power storage device 3 to be charged with a small current slowly over a long time during the night power service time, by making effective use of the limited capacity of the AC power line.

When necessary, a switch SW1 is closed and the electric power stored in the electric power storage device 3 is converted into a large current of substantially uniform amplitude by a DC/DC converter 4. The large current is supplied to output terminals 6. For example, in order to quickly charge an electric double layer capacitor 5 mounted in an electric vehicle, this capacitor 5 is connected across the output terminals 6 through a connection cable or the like.

The maximum permissible current for the electric double layer capacitor 5 is limited because of its structure. Therefore, the DC/DC converter 4 is preferably a switching constant-current DC/DC converter which roughly converts its input current into a regulated current within the limits of the maximum permissible current and can transmit a large current with low loss.

Figure 6:
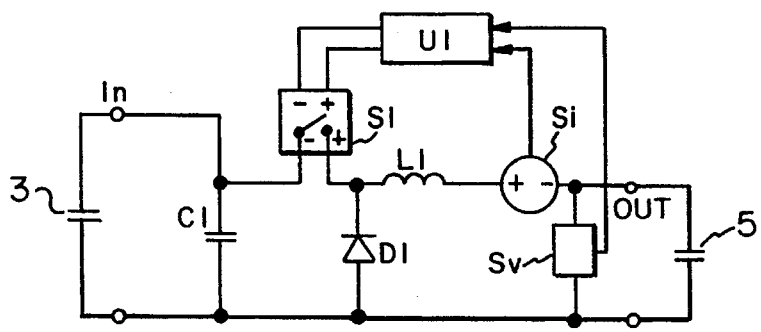
FIG. 6 is a circuit diagram of a DC/DC converter useful as a current regulated power supply according to this invention.

FIG. 6 is a circuit diagram of one example of such a DC/DC converter. In principle, this converter is a step-down type switching regulator. In FIG. 6, a switching device S1, a choke coil L1 and a current sensor Si are connected in series between an input terminal in and an output terminal out. An output voltage sensor Sv is connected with the output terminal out. The output from this sensor is supplied to a control unit U1 together with the output from the current sensor Si. A freewheel diode D1 is connected between the switching device S1 and the choke coil L1. When the switching device S1 is ON, D1 does not conduct current. When the switching device S1 is OFF, the diode D1 forms a current path through which the energy stored in the choke coil L1 is released.

A capacitor C1 has a low internal resistance and an electrostatic capacitance of about 0.2 to 2 µF and is connected between the input terminals to prevent a peak current from being applied to the input whenever the switching device S1 is turned on and off.

In the structure described above, the current sensor Si detects the output current. When this output current exceeds a given value, the control unit U1 acts to turn off the switching device S1. In spite of this, the current stored in the choke coil L1 flows out via the diode D1. When this current drops below a certain value, the control unit U1 turns on the switching device S1. These steps are repeated and thus the electric double layer capacitor 5 is charged with a given current. The voltage developed across the terminals of the capacitor is detected by the voltage sensor Sv. If this detected voltage reaches a given value, the control unit U1 maintains the switching device S1 in OFF state, whereby the charging is stopped.

Figure 7A:
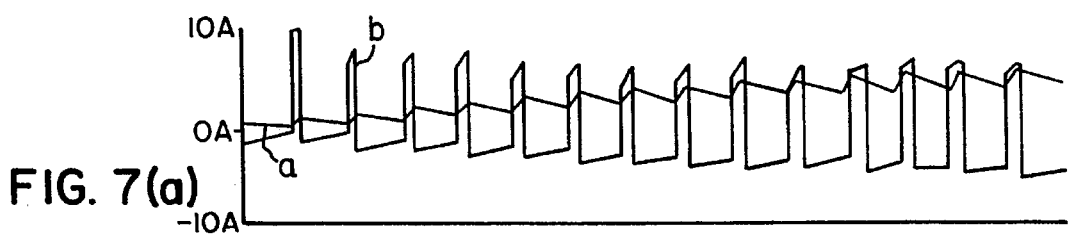
FIGS. 7(a) and 7(b) are waveform diagrams of signals appearing at various portions of the DC/DC converter shown in FIG. 6.
Figure 7B:
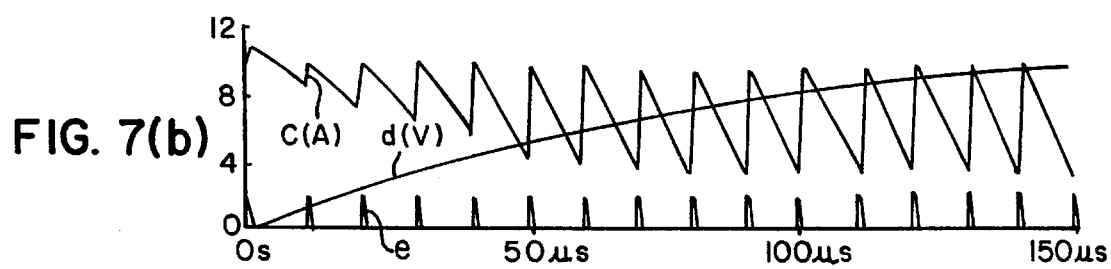

The waveforms of signals appearing at various portions of the circuit shown in FIG. 6 are shown in FIGS. 7(a) and 7(b). In FIG. 7(a), current a flows through the current sensor Si. Current b flows through the capacitor C1. In FIG. 7(b), current c flows through the choke coil L1. The output voltage is indicated by d. Clock pulses e are used within the control unit U1.

With the charging device shown in FIG. 5, electric double layer capacitors used in high power applications such as capacitors mounted in an electric vehicle can be quickly charged by domestic equipment capable of receiving only a small amount of electric power by using midnight electric power or ordinary electric power, if necessary. If this charging device is installed in a charging station for electric vehicles which is analogous to a conventional automobile gas station, electric power stored from a power line over a long time at night can be used to charge plural electric vehicles in the daytime. Therefore, this charging station can be operated with lower instantaneous power-receiving capability.

Where an electric double layer capacitor is charged with a constant-current source as shown in FIG. 2, if completely full charging should be accomplished, then it is necessary to conduct charging (analogous to relaxation charging for secondary batteries) for about 1 hour, for example, after a fully charged state is approached. This is described in further detail below.

Figure 8:
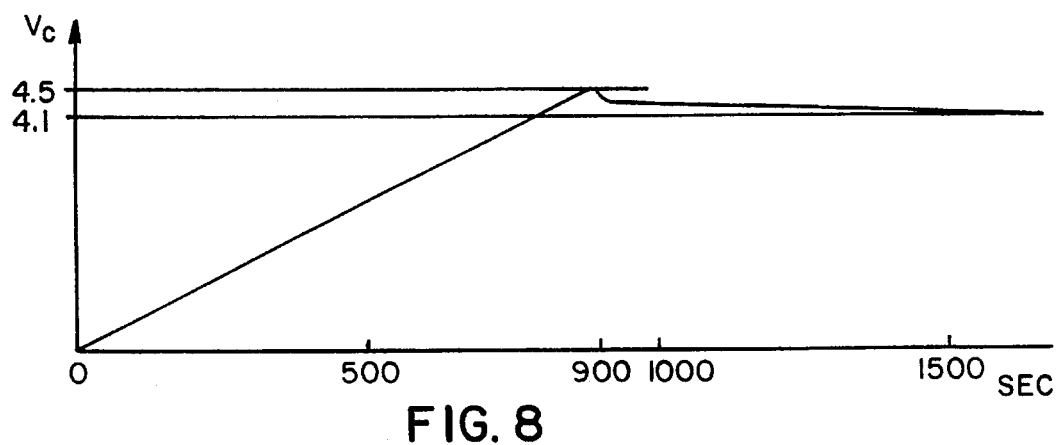
FIG. 8 is a graph showing the variations of the terminal voltage Vc shown in FIG. 3, but in which variations of the terminal voltage occurring after charging is stopped are also shown.

FIG. 8 is a graph showing variations of the voltage Vc shown in FIG. 3 after the charging has been stopped. As can be seen from this graph, the voltage Vc across the terminals reaches 4.5 volts, which corresponds to a fully charged state, at the instant of 900 seconds. If the charging is stopped, the voltage Vc begins to drop. After a lapse of tens of minutes, the voltage settles down to about 4.1–4.2 volts. In brief, when the voltage across the terminals reaches a voltage corresponding to a fully charged state, if the charging is immediately stopped, then the voltage across the terminals decreases.

In order to prevent this, when the voltage across the terminals reaches 4.5 volts corresponding to a fully charged state, the output voltage from the charging device is maintained at 4.5 volts and then the charging is continued for a period between about 30 minutes and 1 hour. This charging is analogous to relaxation charging for secondary batteries. After this charging, the voltage across the terminals no longer drops.

Figure 9:
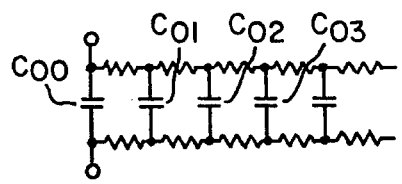
FIG. 9 is a diagram of a circuit equivalent to an electric double layer capacitor.

The cause of this voltage drop can be understood by expressing the capacitor by means of an equivalent circuit as shown in FIG. 9. In particular, when the capacitor array shown in FIG. 9 is first charged, electric charge is first stored in a main capacitor $C_{00}$ inside the capacitor array. This increases the voltage developed across the terminals. Other capacitors $C_{01}$, $C_{02}$, $C_{03}$, $C_{04}$, etc. are gradually charged via resistors with time delays. When the voltage across the main capacitor $C_{00}$ reaches 4.5 volts and the charging is stopped, electric charge stored in the main capacitor is supplied into the other capacitors, resulting in a decrease in the voltage across the terminals. When the electric charge is supplied to the final capacitor, the voltage across the terminals settles down. In this way, the electric charge is applied until the charge is supplied into the final capacitor. That is, this charging analogous to the relaxation charging can prevent the voltage from dropping.

Figure 10:
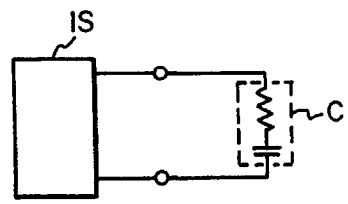
FIG. 10 is a circuit diagram for explanation of a further embodiment according to the invention.
Figure 11:
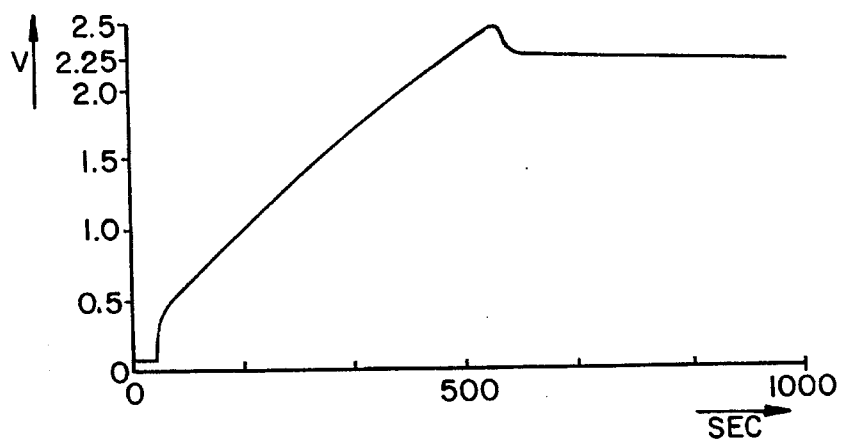
FIG. 11 is a graph showing the behavior in which the voltage developed across the terminals of the capacitor of the circuit shown in FIG. 10 varies with time after charging is started.

An example of the invention in which charging analogous to relaxation charging can be avoided is described below. This example uses a circuit as shown in FIG. 10. An electric double layer capacitor C has a working voltage of 2.25 volts, an internal resistance of 200 milliohms, and an electrostatic capacitance of 260 farads. This capacitor C is discharged to 0.05 volt and recharged by a constant-current, limited-voltage type charger IS. The output current from the charger is 1.0 amps. The limit of the voltage is set to 2.5 volts, which is in excess of the working voltage of 2.25 volts of the electric double layer capacitor by 0.25 volt. FIG. 11 shows actually measured values, or variations, of the voltage developed across the terminals of the capacitor after it is started to be charged.

In FIG. 11, after a lapse of about 550 seconds since the constant-current charging of 1.0 amps was started, the working voltage reached 2.25 volts. This constant-current charging was continued for 50 seconds. When the limit of the voltage of 2.5 volts is reached, the charging was stopped. Then, the voltage across the terminals gradually decreased. After a lapse of about 700 seconds since the charging was initiated, the voltage reached the working voltage of 2.25 volts.

In this way, by overcharging the capacitor in excess of the working voltage, the capacitor could reach the working voltage of 2.25 volts in a short time without introducing a relaxation time after the charging was stopped.

In this case, the amount of overcharging is preferably equal to an amount of electricity charged by relaxation charging. However, the former amount may be slightly over or under the latter amount. The amount of electricity overcharged is determined by the limit of the voltage and by the time taken to reach the limit of the voltage, which is set by the charger.

Figure 12:
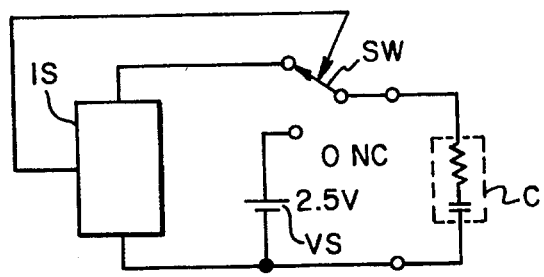
FIG. 12 is a circuit diagram of yet another embodiment according to the invention.
Figure 13:
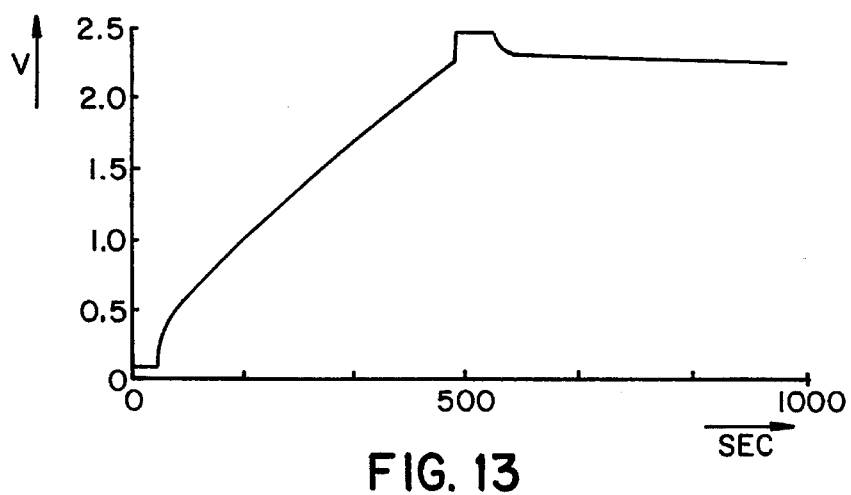
FIG. 13 is a graph showing the behavior in which the voltage developed across the terminals of the capacitor of the circuit shown in FIG. 12 varies with time.

FIG. 12 is a circuit diagram of another example of the invention. This circuit has a constant-current, limited-voltage type power supply IS. In addition, the circuit has a DC power supply VS producing an output voltage of 2.5 volts and a switch SW for selecting either the power supply VS or IS. At first, this switch SW is connected with the power supply IS. Therefore, the voltage across the terminals rises linearly from the beginning of charging as shown in FIG. 13 and reaches a working voltage of 2.25 volts. If the power supply IS senses that the voltage across the terminals has reached the working voltage, the power supply IS sends a switching signal to the switch SW to connect it with the power supply VS during a given period. Then, the power supply IS connects the switch SW to a non-connected contact NC. Thus, the charging is ended.

As shown in FIG. 13, the voltage across the terminals begins to drop gradually immediately after the end of the charging. After a lapse of about 900 seconds since the charging was started, the voltage settled in the working voltage of 2.25 volts.

In this way, if the capacitor is overcharged, i.e., charged in excess of the working voltage, the time during which the voltage is maintained at this excessive voltage is about 10% of the charging time. This is quite short compared with the whole period during which the electric double layer capacitor is used. Consequently, the effects on the characteristics and on the life can be made sufficiently small.

The working voltage referred to herein can be the maximum working voltage denoted on the electric double layer capacitor. Furthermore, the working voltage can be a charging voltage which is set lower than the maximum working voltage by the user to extend the life. For example, if the rated voltage or the maximum working voltage denoted on the electric double layer capacitor is 5 volts, and if the charging voltage is set to 4.45 volts, i.e., lower than 5 volts by about 10%, then the voltage of 4.45 volts is the working voltage in the present invention.

Figure 14:
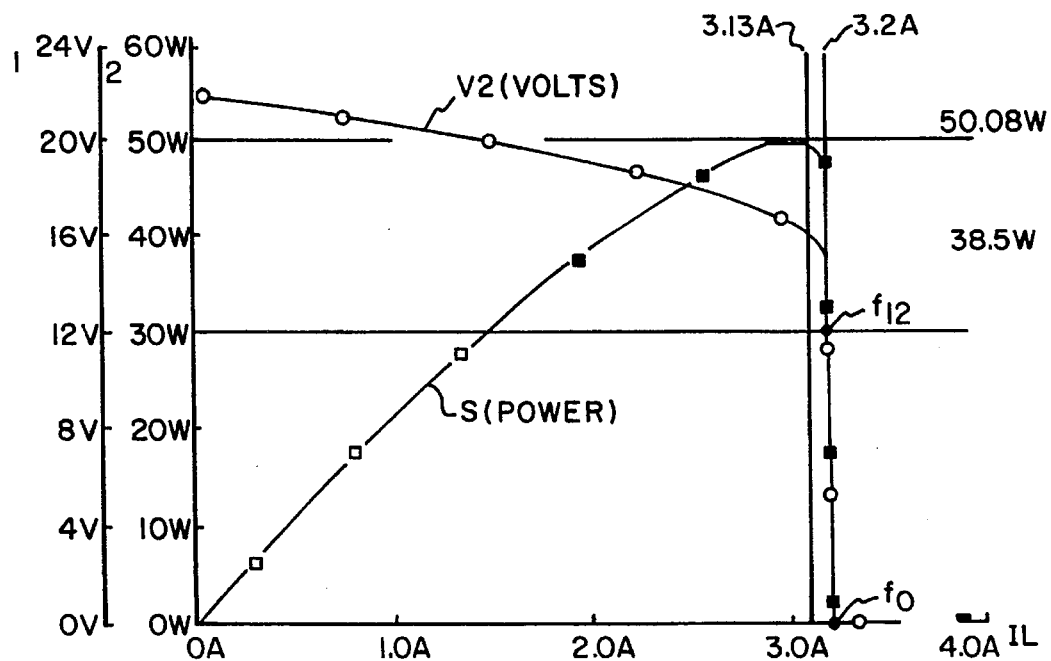
FIG. 14 is a diagram showing the output characteristics of a solar battery.

The present invention can be used effectively when electric power from a solar battery is stored in an electric double layer capacitor. The output characteristics of the solar battery are shown in FIG. 14, which indicates the terminal voltage (V2) load current (IL) characteristic of a 50 W (watt) solar cell array manufactured by Kyocera Corporation when sunlight falling on the array is 100 W/cm$^2$. Also shown is the output electric power S (=V2×IL)–load current (IL) characteristic. When the maximum point of the output electric power is read, the output electric power when the output current is 3.13 amps is 50.08 watts.

In the case in which a lead-acid battery of rated voltage 12 volts is connected with this solar battery to charge the lead-acid battery. An output current of 3.20 amps and an output electric power of 38.5 watts can be taken from the solar battery. The lead-acid battery can be charged by this electric power.

Figure 15:
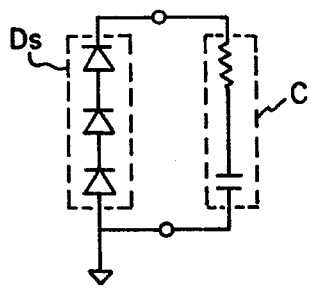
FIG. 15 is a diagram of a circuit having a solar battery with which an electric double layer capacitor is directly connected in series.

However, if an electric double layer capacitor is connected in series with the solar battery instead of the lead-acid battery and the capacitor is charged, the following problem takes place. A solar battery Ds has characteristics as shown in FIG. 14. It is assumed that an electric double layer capacitor C having an internal resistance of 50 milliohms, an electrostatic capacitance of 200 farads, and a rated voltage of 12 volts is connected with the solar battery Ds, as shown in FIG. 15. Under the same sunshine conditions as in the case of FIG. 14, the voltage across the terminals of the electric double layer capacitor C rises linearly as indicated by V9 in FIG. 16 and the charging progresses. The voltage across the terminals reaches 12 volts in 737 seconds.

FIG. 17(b) shows variations in the charging current IC for charging the electric double layer capacitor C described above. FIG. 17(a) shows a charging electric power SC (=IC×V9). Variations in the charging electric power SC demonstrate that the electric power generated by the solar battery is hardly used for a time after charging is started. With the lapse of time, the electric power is employed more effectively. On average, only about half of the electric power which can be produced by the solar battery during the charging period is used for charging.

In FIG. 17(b), the charging current IC is maintained at 3.2 amps almost over the whole charging period and so the low utilization efficiency can be explained away as follows. Comparison with the characteristics of the output from the solar battery shown in FIG. 14 shows that at the beginning of charging, the solar battery output is short-circuited by the electric double layer capacitor which has been fully discharged. As a result, the operating point lies at $f_0$, and an electric current exceeding 3.2 amps flows. As the charging process progresses and the voltage across the terminals of the capacitor rises, the output voltage from the solar battery increases. Concomitantly, the operating point rises along straight line 1 and reaches position $f_{12}$. At this time, the voltage V9 across the terminals of the capacitor reaches 12 volts.

It can be seen from the results of the above-described discussion that when the electric double layer capacitor is directly connected in series with the solar battery, the solar battery output is short-circuited at the beginning of charging and so when the voltage across the terminals assumes low values, only a small fraction of the electric power which can be taken from the solar battery can be exploited. Hence, the capability of the solar battery to generate electricity cannot be fully utilized.

Figure 18:
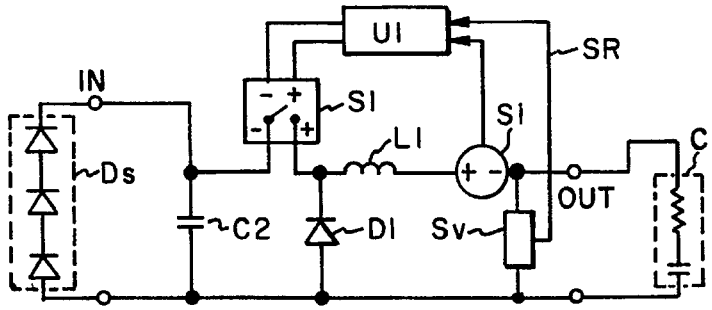
FIG. 18 is a circuit diagram of still another embodiment according to the invention.

FIG. 18 shows an example of the invention made, based on the analysis described above. In FIG. 18, a DC/DC switching regulator SR is disposed between a solar battery Ds and an electric double layer capacitor C. The regulator SR is of the current controlled output type and identical in configuration with the DC/DC converter shown in FIG. 6. The solar battery Ds is connected with the input terminal in of the switching regulator SR. The DC electric power from this solar battery is supplied to the capacitor C connected with the output terminal out of the regulator SR.

The essential operation of this switching regulator SR is exactly the same as the operation of the structure shown in FIG. 6. This switching regulator SR charges the electric double layer capacitor C under current control of a control unit U1. Information about the maximum value (50.08 watts) of the output electric power from the solar battery shown in FIG. 14 is stored in the control unit U1. The control unit U1 calculates from the output voltage of a voltage sensor Sv a current value IC1 at which the output electric power assumes its maximum value 50.08 watts. Then, the control unit controls a switching device S1 so that the charging current assumes the calculated current value IC1. As a result, the solar battery operates while utilizing the maximum point $f_{max}$ in the output electric power characteristic S shown in FIG. 14 as its operating point. In this way, the maximum electric power is kept supplied to the capacitor at all times.

IC1 of FIG. 17(b) shows the output current from the switching regulator SR. V19 of FIG. 16 shows the voltage across the terminals of the electric double layer capacitor C. SC1 of FIG. 17(a) shows the charging electric power (=IC1×V19). It can be seen from these diagrams that the charging power SC1 is maintained substantially at 50 watts after a lapse of 100 seconds.

When the voltage across the terminals of the electric double layer capacitor C is close to zero, the charging current IC1 is calculated to be infinitely large. However, limitations imposed on the current capacity of the capacitor C and the charger make it impossible to set the charging current to infinity. Therefore, in the present example, the maximum value of the charging current set by the control unit U1 is limited to 10 amps. Hence, the charging power SC1 is decreased during a period between 0 and 100 seconds.

It can be seen from FIG. 16 that the voltage V19 across the terminals of the capacitor reaches 12 volts, i.e., a fully charged state, in 336 seconds. Where the voltage across the terminals is V9 as in the previous example, i.e., when the switching regulator SR is not used, the charging time is 737 seconds. The ratio of the charging time of the present example to the charging time of the previous example is 336/737=0.456. That is, the charging can be completed in a time less than a half of the charging time in the previous example.

The output characteristic of a solar battery varies, for example, depending on the intensity of irradiated light. FIG. 14 shows an example of the output characteristic. In practice, therefore, plural sets of information about the maximum electric power are stored in the control unit U1 according to a plurality of values of incident light intensity. The intensity of incident light is measured, using either one of the solar cells forming the solar battery or a light sensor mounted close to the solar battery. A control operation is performed by making use of the maximum electric power value corresponding to the measured intensity of incident light.

It is also possible to design the control unit U1 so that it is capable of searching for an optimum value. Specifically, the charging current is varied within an appropriate range. As a result, the charging power is varied. These variations in the charging power are detected. The control unit U1 varies the charging current in response to the charging power so as to increase the charging power. In this case, it is not necessary to store information regarding the maximum electric power in the control unit U1.

Having thus described our invention with the detail and particularity required by the Patent Laws, what is desired protection by Letters Patent is set forth in the following claims.

What is claimed is:

1. A method of charging an electric double layer capacitor, comprising the step of:

charging said electric double layer capacitor from a constant-current power supply.

2. An apparatus for charging an electric double layer capacitor, comprising:

a current controlled output type switching DC power supply which charges said electric double layer capacitor.

3. An apparatus for charging an electric double layer capacitor, comprising:

an electric power storage device to store electric energy from an external power line; and a DC/DC converter for converting output electric power from said electric power storage device into a substantially constant-current output, said storage device supplying said substantially constant-current output to said electric double layer capacitor which acts as a load.

4. An apparatus for charging an electric double layer capacitor as set forth in claim 3, wherein said electric power storage device is controlled by a timer or a remote control signal and acting to store electric power during a predetermined period of time.

5. An apparatus for charging an electric double layer capacitor as set forth in claim 3 or 4, wherein said DC/DC converter is a switching constant-current converter.

6. A method of charging an electric double layer capacitor as set forth in claim 1, wherein said electric double layer capacitor is overcharged so that it is charged up to a preset voltage exceeding a working voltage of said capacitor.

7. A method of charging an electric double layer capacitor as set forth in claim 6, wherein said capacitor is overcharged by a constant current supplied from said constant-current power supply.

8. A method of charging an electric double layer capacitor as set forth in claim 6, wherein said capacitor is overcharged by a power supply other than said constant-current power supply.

9. A method of charging an electric double layer capacitor as set forth in any one of claims 6 to 8, wherein said capacitor is overcharged by an amount of electricity substantially corresponding to an amount of electricity injected during relaxation charging of said electric double layer capacitor.

10. A method of charging an electric double layer capacitor with a solar battery, comprising the steps of:

preparing said solar battery; and placing a constant-current output switching regulator between said solar battery and said electric double layer capacitor to charge said capacitor with electric power from said solar battery.

11. A method of charging an electric double layer capacitor with a solar battery as set forth in claim 10, wherein constant output current from said switching regulator is so controlled as to approach a current value at which said solar battery produces its maximum output.

* * * * *